United States Patent
Chang et al.

(10) Patent No.: US 10,404,091 B2
(45) Date of Patent: Sep. 3, 2019

(54) COIL SUBSTRATE

(71) Applicant: Samsung Electro-Mechanics Co., Ltd., Suwon-si (KR)

(72) Inventors: Ki Won Chang, Suwon-si (KR); Hyung Wook Cho, Suwon-si (KR); Dong Woo Han, Suwon-si (KR); Si Hyung Kim, Suwon-si (KR); Tae Seok Yang, Suwon-si (KR); Choon Hee Kim, Suwon-si (KR); Chang Mok Han, Suwon-si (KR); Taek Woo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 121 days.

(21) Appl. No.: 15/292,397

(22) Filed: Oct. 13, 2016

(65) Prior Publication Data
US 2017/0201114 A1   Jul. 13, 2017

(30) Foreign Application Priority Data

Jan. 7, 2016  (KR) .................. 10-2016-0002233

(51) Int. Cl.
*H02J 7/02* (2016.01)
*H02J 50/80* (2016.01)
(Continued)

(52) U.S. Cl.
CPC ............ *H02J 7/025* (2013.01); *H02J 7/0027* (2013.01); *H02J 7/0042* (2013.01); *H02J 50/10* (2016.02); *H02J 50/80* (2016.02); *H04B 5/0037* (2013.01)

(58) Field of Classification Search
CPC . H02J 50/23; H02J 50/80; H02J 7/025; H04B 5/0037
See application file for complete search history.

(56) References Cited

U.S. PATENT DOCUMENTS 6,380,835 B1    4/2002   Lee
6,972,658 B1 *  12/2005  Findley ............... H01F 17/0006
                                                      257/531

(Continued)

FOREIGN PATENT DOCUMENTS

CN     1402426 A    3/2003
JP    8-162327 A    6/1996

(Continued)

OTHER PUBLICATIONS

Korean Office Action dated Sep. 22, 2017, in corresponding Korean Application No. 10-2016-0002233 (9 pages in English, 7 pages in Korean).

(Continued)

*Primary Examiner* — Rexford N Barnie
*Assistant Examiner* — Elim Ortiz
(74) *Attorney, Agent, or Firm* — NSIP Law

(57) ABSTRACT

A coil substrate for wireless power transmission includes: an insulating substrate including a first surface and a second surface; a first wiring portion disposed on the first surface, wherein the first wiring portion includes first spiral patterns and a section in which opposing ends of each of the first spiral patterns are disposed parallel to each other; a second wiring portion disposed on the second surface and including second spiral patterns, wherein opposing ends of each of the second spiral patterns are spaced apart from each other; and conductive vias alternately connecting the first spiral patterns and the second spiral patterns to each other to form coil turns.

21 Claims, 5 Drawing Sheets

(51) Int. Cl.
*H04B 5/00* (2006.01)
*H02J 7/00* (2006.01)
*H02J 50/10* (2016.01)

(56) References Cited

U.S. PATENT DOCUMENTS

| | | | |
|---|---|---|---|
| 2002/0130387 A1* | 9/2002 | Carpentier | H01L 27/08 257/531 |
| 2003/0016506 A1 | 1/2003 | Fujii | |
| 2003/0030510 A1 | 2/2003 | Sasaki et al. | |
| 2003/0085788 A1* | 5/2003 | Yue | H03F 3/45183 336/200 |
| 2003/0137383 A1* | 7/2003 | Yang | H01F 17/0013 336/200 |
| 2003/0222750 A1* | 12/2003 | Kyriazidou | H01F 17/0013 336/200 |
| 2007/0205856 A1 | 9/2007 | Matsunaga et al. | |
| 2012/0274148 A1 | 11/2012 | Sung et al. | |
| 2016/0094082 A1* | 3/2016 | Ookawa | H01F 38/14 320/108 |

FOREIGN PATENT DOCUMENTS

| | | |
|---|---|---|
| JP | 2003-36421 A | 2/2003 |
| JP | 4381417 B2 | 12/2009 |
| JP | 2014-222707 A | 11/2014 |
| KR | 2001-0011350 A | 2/2001 |
| KR | 10-1179398 B1 | 9/2012 |

OTHER PUBLICATIONS

Chinese Office Action dated May 28, 2018 in Chinese Patent Application No. 201610977239.3 (11 pages in English, 7 pages in Chinese).

* cited by examiner

I-I'

'A'

'B'

COIL SUBSTRATE

CROSS-REFERENCE TO RELATED APPLICATIONS

This application claims benefit under 35 USC 119(a) of Korean Patent Application No. 10-2016-0002233 filed on Jan. 7, 2016 in the Korean Intellectual Property Office, the entire disclosure of which is incorporated herein by reference for all purposes.

BACKGROUND

1. Field

The following description relates to a coil substrate.

2. Description of Related Art

Currently, many handheld terminals are provided with systems allowing wirelessly transmitted power to be received to charge a battery provided therein, or to perform additional functions, such as radio frequency identification (RFID), near field communications (NFC), and magnetic security transmissions (MST). These functions are commonly performed by coils. Accordingly, a plurality of coils may be mounted in a handheld terminal to enable one or more of the above functions.

In addition to a desire to provide handheld terminals with the above described functions through the receipt of wireless power, there is a desire to provide handheld terminals with a thin physical form. Accordingly, a coil structure that may provide a high degree of efficiency while minimizing the size of coils is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil substrate for wireless power transmission includes: an insulating substrate including a first surface and a second surface; a first wiring portion disposed on the first surface, wherein the first wiring portion includes first spiral patterns and a section in which opposing ends of each of the first spiral patterns are disposed parallel to each other; a second wiring portion disposed on the second surface and including second spiral patterns, wherein opposing ends of each of the second spiral patterns are spaced apart from each other; and conductive vias alternately connecting the first spiral patterns and the second spiral patterns to each other to form coil turns.

The first spiral patterns may include: a winding section forming a single coil turn; and an extension section extending from the winding section and disposed parallel to a portion of the winding section.

A line width of the extension section and a line width of a portion of the winding section parallel to the extension section may be narrower than a line width of a portion of the winding section extending from the extension section.

The conductive vias may be disposed in the opposing ends of each of the second spiral patterns to connect the first wiring portion to the second wiring portion.

The coil substrate may further include a lead wiring, wherein the lead wiring includes an end disposed inside the second spiral patterns, and a portion intersecting a region between the second spiral patterns where the opposing ends of each of the second spiral patterns are spaced apart from each other.

In another general aspect, a coil substrate for wireless power transmission includes: an insulating substrate; a first wiring portion and a second wiring portion formed on a first surface and a second surface of the insulating substrate, respectively; and conductive vias connecting the first wiring portion and the second wiring portion to each other to form coil turns.

The first wiring portion may include: first spiral patterns each including a winding section forming a single coil turn; and an extension section extending from an end of the winding section.

Another end of the winding section may be disposed parallel to the extension section.

A line width of the extension section and a line width of a portion of the winding section parallel to the extension section may be narrower than a line width of a portion of the winding section extending from the extension section.

The conductive vias may include first vias connecting opposing ends of the first spiral patterns of the first wiring portion to the second wiring portion.

The second wiring portion may include second spiral patterns which are partially disconnected such that opposing ends of the second spiral patterns do not overlap each other.

The second wiring portion may further include a lead wiring, wherein the lead wiring includes an end disposed inside the second spiral patterns, a portion intersecting a region between the opposing ends of the second spiral patterns, and another end disposed outside the second spiral patterns.

The region between the opposing ends of the second spiral patterns may be a region in which the second spiral patterns are partially disconnected.

The conductive vias may include second vias connecting the lead wiring to the first spiral pattern.

The conductive vias may be disposed in a row in winding directions of the first wiring portion and the second wiring portion.

In another general aspect, an electronic device includes: a wireless power coil disposed on a substrate and including a first wiring portion formed on a first surface of the substrate, a second wiring portion disposed on a second surface of the substrate, and conductive vias connecting the first wiring portion and the second wiring portion to each other to form coil turns.

The first wiring portion may include first spiral patterns and a section in which opposing ends of each of the first spiral patterns are disposed parallel to each other. The second wiring portion may include second spiral patterns, wherein opposing ends of the second spiral patterns are spaced apart from each other.

The vias may connect the first spiral patterns and the second spiral patterns to each other in an alternating manner.

The second wiring portion may further include a lead wiring. The lead wiring may include an end disposed inside the second spiral patterns, a portion intersecting a region between the opposing ends of the second spiral patterns, and another end disposed outside the second spiral patterns.

The electronic device may further include either one or both of: a power receiver configured to wirelessly receive power using the first wiring portion and the second wiring portion; and a power transmitter configured to wirelessly transmit power using the first wiring portion and the second wiring portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
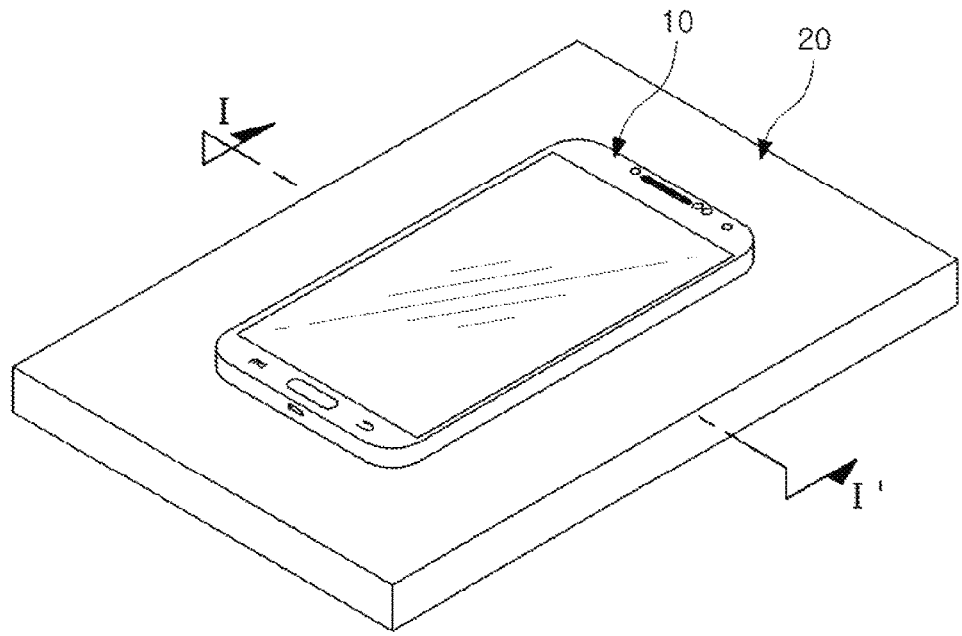
FIG. 1 is a schematic perspective view of an electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the term "and/or" includes any one and any combination of any two or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
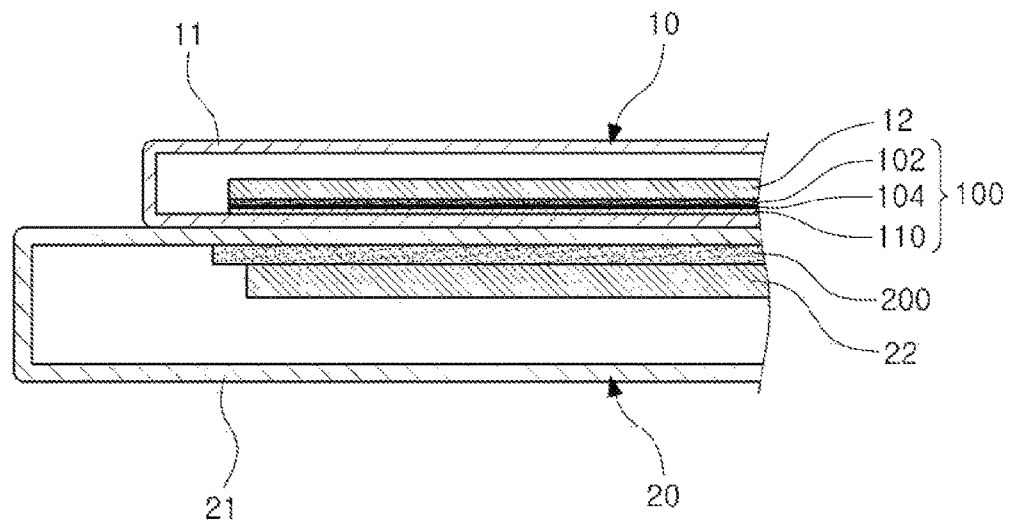
FIG. 2 is a cross-sectional view of the electronic device taken along line I-I' of FIG. 1.

FIG. 1 is a schematic perspective view of electronic devices 10 and 20, according to an embodiment. FIG. 2 is a cross-sectional view of the electronic devices 10 and 20 taken along line I-I' of FIG. 1. Referring to FIGS. 1 and 2, the electronic device 20, according to an embodiment, may be a wireless charger 20 configured to wirelessly transmit power. The electronic device 10, according to an embodiment, may be a handheld terminal such as, but not limited to, a smartphone, configured to wirelessly receive (e.g., from the wireless charger 20) and store power.

The handheld terminal 10 includes a battery 12 and a power receiver 100 configured to supply power to the battery 12 to charge the battery 12. The battery 12 may be a secondary battery capable of being charged or discharged, and may be configured to be attached to or detached from the handheld terminal 10. However, the battery 12 is not limited to being a secondary battery, and is not limited to such a detachable configuration.

The power receiver 100 is disposed inside a case or housing 11 of the handheld terminal 10, directly attached to an inner surface of the case 11 or disposed to be as close as possible to the inner surface of the case 11, for example.

The power receiver 100 includes a magnetic portion 102 and a coil substrate 110. The magnetic portion 102 may have a flat plate shape (or a sheet shape), and is disposed on one surface of the coil substrate 110 to be fixedly attached to the coil substrate 110. The magnetic portion 102 forms a magnetic path for a magnetic field generated by a coil wiring of the coil substrate 110. To this end, the magnetic portion 102 includes a material allowing a magnetic path to be easily formed. For example, the magnetic portion 102 may include a ferrite sheet.

Although not illustrated, the magnetic portion 102 may include an additional metal sheet to block electromagnetic waves or magnetic flux leakage, if necessary or desired. The metal sheet may be formed of aluminum (Al), or the like. However, the metal sheet is not limited to being formed of aluminum (Al).

According to an embodiment, the power receiver 100 includes an adhesive portion 104 interposed between the coil substrate 110 and the magnetic portion 102 so that the coil substrate 110 and the magnetic portion 102 are fixedly bonded to each other.

The adhesive portion 104 is disposed in a space between the coil substrate 110 and the magnetic portion 102, and bonds the magnetic portion 102 to the coil substrate 110. The adhesive portion 104 is formed of an adhesive sheet or an adhesive tape, and may also be formed by spreading an adhesive or a resin having adhesive properties onto the coil substrate 110 or the magnetic portion 102. The adhesive portion 104 may include a ferrite powder, and thus may also have magnetic properties together with the magnetic portion 102.

The charger 20 charges the battery 12 of the handheld terminal 10. For this purpose, the charger 20 includes a voltage converter 22 and a power transmitter 200 disposed inside a case or housing 21.

The voltage converting unit 22 converts commercially available alternating current (AC) power, supplied from an external power source, into direct current (DC) power, converts the converted DC power to an AC voltage having a certain frequency, and provides the converted AC voltage to the power transmitter 200.

A level of a magnetic field around the power transmitter 200 changes in response to the abovementioned AC voltage being applied to the power transmitter 200. Accordingly, in response to a voltage being applied to the power receiver 100 of the electronic device 10 adjacent to the power transmitter 200, the battery 12 is charged based on changes in the magnetic field.

The power transmitter 200 is configured to be similar to the above-mentioned power receiver 100. More specifically, the structure of the power transmitter 200 may be the same as or similar to the structure of the power receiver 100. Accordingly, a detailed description of the power transmitter 200 will be omitted.

Figure 3:
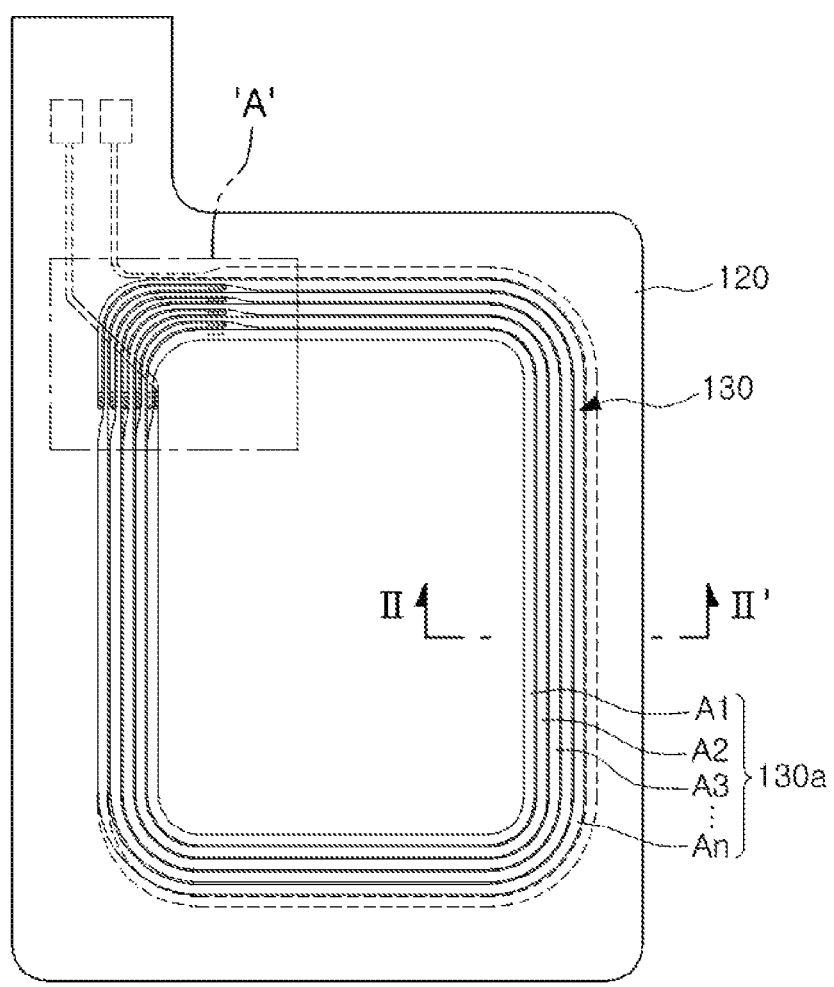
FIG. 3 is a schematic plan view of a coil substrate illustrated in FIG. 2, according to an embodiment.
Figure 4:
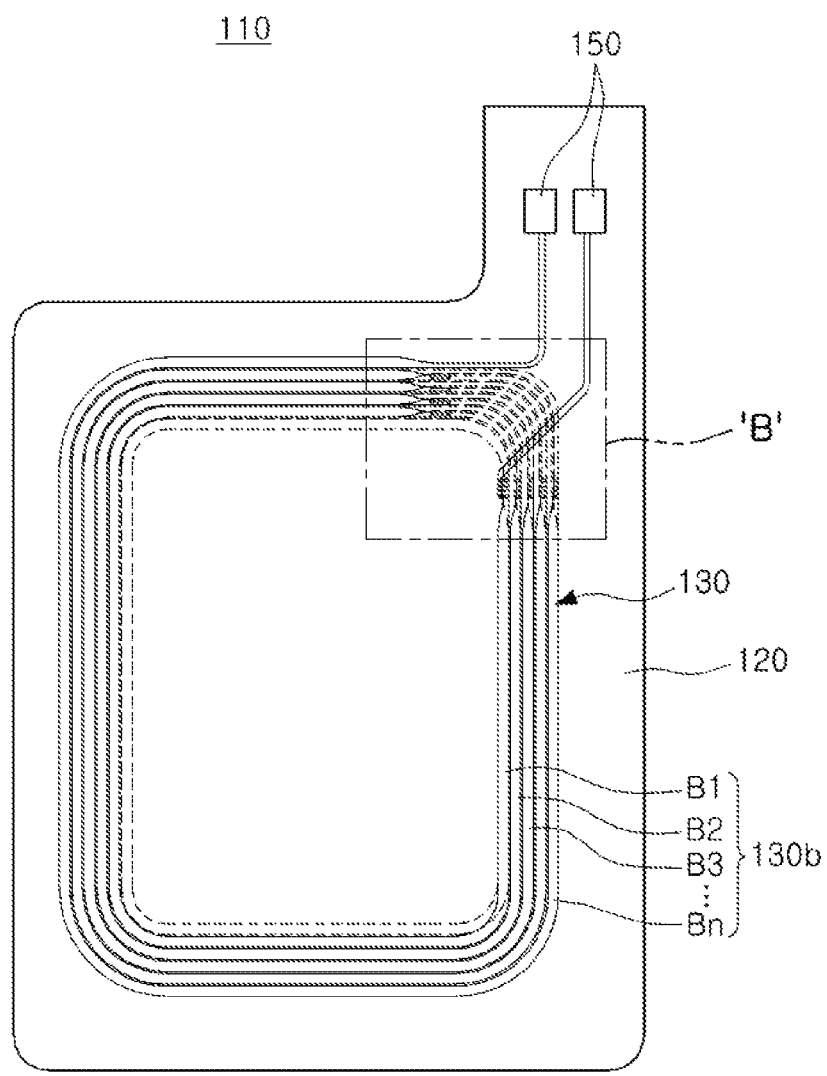
FIG. 4 is a bottom view of a coil substrate.
Figure 5:
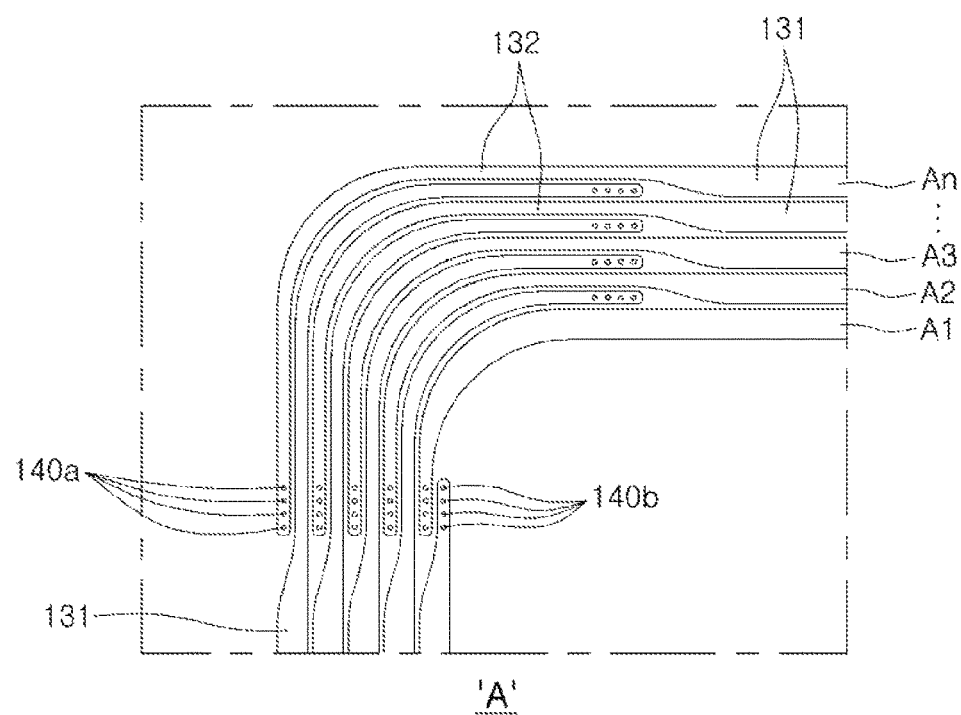
FIG. 5 is a partially enlarged view of region A of FIG. 3.
Figure 6:
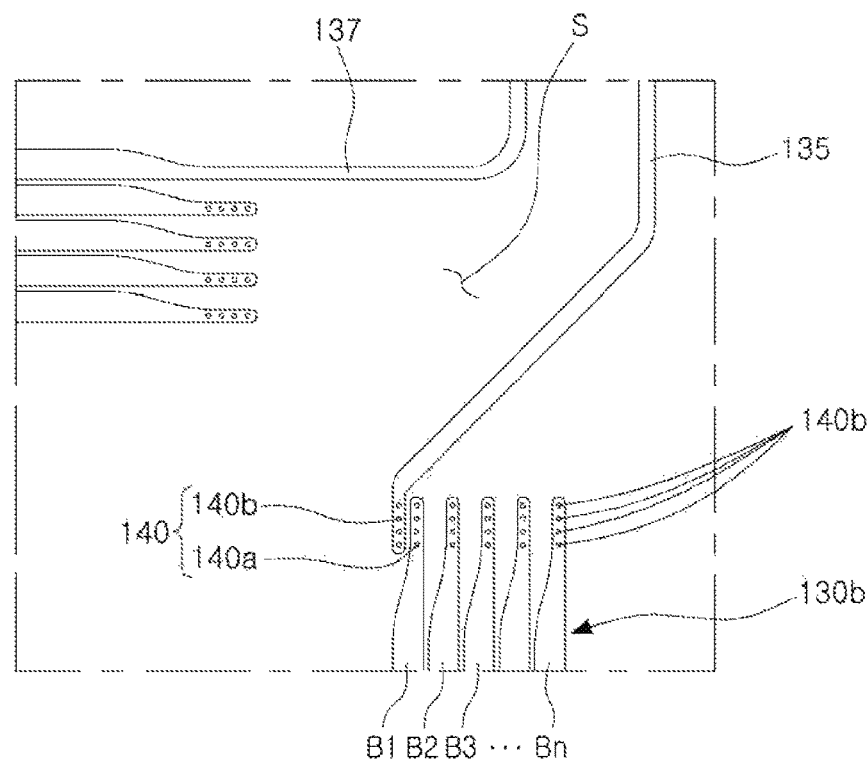
FIG. 6 is a partially enlarged view of region B of FIG. 4.

The coil substrate 110 of the power receiver 100 will hereinafter be described in more detail with respect to FIGS. 3-6. FIG. 3 is a schematic plan view illustrating the coil substrate 110. FIG. 4 is a bottom view of a coil substrate, such as the coil substrate 110 of FIG. 3. In addition, FIG. 5 is a partially enlarged view of region A of FIG. 3, and FIG. 6 is a partially enlarged view of region B of FIG. 4. Parts indicated by dotted line in FIGS. 3 through 6 depict a coil wiring disposed on a respectively illustrated opposite surface of the coil substrate 110 illustrated in FIGS. 3 through 6.

Referring to FIGS. 3 through 6, the coil substrate 110, according to an embodiment, includes a substrate 120, and a coil wiring 130 formed on two opposing surfaces of the substrate 120.

The substrate 120 may be an insulating substrate, and, for example, may be an insulating film (for example, a polyimide film) of the type commonly used in a flexible printed circuit board (PCB). However, the present disclosure is not limited to such a film, and various types of materials may be used as long as the substrate 120 is formed to have a reduced thickness and to have a circuit wiring on opposing surfaces thereof.

According to an embodiment, the coil wiring 130 is formed on both surfaces of the substrate 120 as a portion of a circuit wiring formed of a copper foil, or the like. For example, the coil wiring 130 may be manufactured by patterning a double-sided copper clad laminate (CCL). The coil wiring 130 may also be formed on two opposing surfaces of a soft insulating substrate, such as a film, by a photolithography process, and may be manufactured as a flexible PCB having a double-sided structure.

Thus, the coil substrate 110, according to an embodiment, may be formed to have a significantly reduced thickness. However, the coil substrate 110 may also be manufactured as a PCB having a high stiffness and a double-sided structure, if necessary.

The coil wiring 130 may be used for transmitting and receiving power for wireless charging. However, the disclosure is not limited to such a use, and the coil wiring 130 may perform at least one of radio frequency identification (RFID), near field communication (NFC), and magnetic security transmission (MST) functions.

According to an embodiment, multiple coil wirings 130 may be provided to perform the above-mentioned functions. For example, each of the coil wirings 130 may be configured to perform a respective one of the wireless charging, RFID, NFC and MST functions. In a case in which multiple coil wirings 130 are provided, all of the coil wirings 130 may have the same structure as the coil wiring 130 according to an embodiment to be described below. However, the disclosure is not limited to such a configuration of coil wirings, and any one of the coil wirings 130 may include the structure of the coil wiring 130 described below.

Referring to FIGS. 3 and 4, the coil wiring 130 includes a first wiring portion 130a disposed on a first surface of the substrate 120, and a second wiring portion 130b disposed on a second surface of the substrate 120. The first wiring portion 130a and the second wiring portion 130b are repeatedly alternately connected to each other (FIG. 8) to form a coil shape.

As shown in FIG. 3, the first wiring portion 130a includes at least one spiral pattern. First to nth spiral patterns A1 to An of the first wiring portion 130a have an overall annular loop shape, but have a partially spiral shape having two distinct ends without forming a closed ring. That is, the two ends of each of the spiral patterns A1 to An are spaced apart.

The plurality of first to nth spiral patterns A1 to An of the first wiring portion 130a are provided to be parallel, or concentric, to one another. In more detail, the first spiral pattern A1 is disposed on an innermost side of the first wiring portion 130a, and the second spiral pattern A2, which is spaced apart from the first spiral pattern A1, is disposed outside of the first spiral pattern A1. The third to nth spiral patterns A3 to An are sequentially spaced apart from each other outside of the second spiral pattern A2. In "An," n defines a positive integer.

Each of the first to nth spiral patterns A1 to An of the first wiring portion 130a has a shape wound around the circumference of an empty internal region in a single turn, and both ends of each of the first to nth spiral patterns A1 to An are spaced apart from each other at a regular interval in a winding direction of the spiral pattern. As illustrated in FIG. 5, each of the second to nth spiral patterns include a winding section 131 and an extension section 132.

Still referencing FIG. 5, the winding section 131 may include a section in which only one turn from one end of each of the second to nth spiral patterns A2 to An is formed, and the extension section 132 may include a section that extends from the end point of the winding section 131 to the other end of each of the second to nth spiral patterns A2 to An.

The extension section 132 is parallel to the winding section 131. Thus, the extension section 132 may be understood as being a section in which multiple turn portions of each of the second to nth spiral patterns A2 to An of the first wiring portion 130a overlap each other. For example, as shown in FIG. 5, each of the spiral patterns of the second to nth spiral patterns A2 to An may include two windings in the extension section 132.

When viewed from the overall structure of the coil wiring 130, according to an embodiment, the extension section 132 forms a portion of the coil turn and thus may be considered as a portion of the winding section 131. However, according to an embodiment, the winding section 131 and the extension section 132 will be separately described for convenience of description.

According to an embodiment, the first spiral pattern A1 does not have an extension section. This may result in a structure in which the first spiral pattern A1 is connected to a lead wiring 135 to be described below. However, the structure of the first spiral pattern A1 is not limited to the foregoing description, and if necessary, the first spiral pattern A1 may include an extension section.

The extension section 132 is formed in one portion of each of the second to nth spiral patterns A2 to An of the first wiring portion 130a, and a line width of the portion including the extension section is smaller than that of other sections of the spiral patterns A2 to An that are not parallel to the extension section. More specifically, the line width of the extension section 132 and a line width of the winding section 131 parallel to the extension section 132 are half or equal to or less than half of the line width of the other sections.

In addition, the second to nth spiral patterns A2 to An of the first wiring portion 130a have a spiral shape in which both ends of each of the second to nth spiral patterns A2 to An are parallel to each other. One end of each of the second to nth spiral patterns A2 to An is formed as the extension section 132, and the other end of each of the second to nth spiral patterns A2 to An and is formed as a part of the winding section 131 parallel to the extension section 132. Line widths of both ends in the extension section 132 and the part of the winding section 131 parallel to the extension section 132 are narrower than that of the other sections of the spiral pattern.

Thus, as illustrated in FIG. 5, the first wiring portion 130a, according to an embodiment, allows spacing intervals between the first to nth spiral patterns A1 to An to be significantly reduced even with the extension section 132.

When the first to nth spiral patterns A1 to An have an even or substantially even line width throughout the spiral patterns, additional space for the extension section 132 may be required, and two spiral patterns (for example, the spiral patterns A2 and A3) adjacent to each other thus need to be spaced apart from each other by a line width equal to that of the extension section 132 or more. Thus, the spacing intervals between the first to nth spiral patterns A1 to An are increased, and the area of the coil substrate 110 is thereby expanded.

However, the coil substrate 110 allows the line width of the portion of the spiral pattern in which the extension section 132 is formed to be equal to half or less than half of the line width of the other portion of the spiral pattern. The intervals between the first to nth spiral patterns A1 to An are thus minimized, even in the portion of the wiring portion 130a including the extension section 132. As a result, the area of the coil substrate 110 is also significantly reduced.

Referring to FIG. 6, the second wiring portion 130b includes the plurality of first to nth spiral patterns B1 to Bn and a lead wiring 135. Similarly to the first wiring portion 130a, the first to nth spiral patterns B1 to Bn of the second wiring portion 130b each have an overall loop shape, but are each formed of a wiring having a partially disconnected "C" shape.

Similar to the first wiring portion 130a, the first to nth spiral patterns B1 to Bn of the second wiring portion 130b are parallel, or concentric, to one another, and have an overall spiral shape. In more detail, the first spiral pattern B1 is disposed on an innermost side of the second wiring portion 130b, and the second spiral pattern B2 spaced apart from the first spiral pattern B1 is disposed outwardly of the first spiral pattern B1. The third to nth spiral patterns B3 to Bn may be sequentially spaced apart from each other outside of the second spiral pattern B2. In "Bn," n defines a positive integer.

Still referring to FIG. 6, the first to nth spiral patterns B1 to Bn of the second wiring portion 130b have a shape in which a single coil turn is wound, and have a partially disconnected "C" shape, rather than a fully wound shape. Thus, both ends of the first to nth spiral patterns B1 to Bn are spaced apart from each other at regular intervals as a snap ring shape, and the disconnected portion of each of the first to nth spiral patterns B1 to Bn has an empty region S in which a spiral pattern is not formed. The lead wiring 135 crosses the empty region S.

The empty region S of the second wiring portion 130b is formed in a position corresponding to that of the portion in which the extension section 132 is disposed in the first wiring portion 130a. As the first to nth spiral patterns B1 to Bn of the second wiring portion 130b have the partially disconnected "C" shape, each of the first to nth spiral patterns B1 to Bn of the second wiring portion 130b only include a winding section, and do not include a section corresponding to the extension section 132 of the first wiring portion 130a.

Because each of the first to nth spiral patterns B1 to Bn of the second wiring portion 130b has a partially disconnected loop shape, only the first to nth spiral patterns B1 to Bn of the second wiring portion 130b do not form a full coil turn, and create the full coil turn through the extension section 132 of the first wiring portion 130a. Thus, a coil turn of a first surface of the substrate 120 is formed by the winding section 131 of the first to nth spiral patterns A1 to An of the first wiring portion 130a, and a coil turn subsequent to the above coil turn is formed by the first to nth spiral patterns B1 to Bn of a second surface of the substrate 120 connected to the extension section 132 through the extension section 132 and a first via 140a of the first wiring portion 130a.

A first end of the lead wiring 135 is disposed inside of the first spiral pattern B1, and the other end thereof is disposed outside of the first to nth spiral patterns B1 to Bn. The lead wiring 135 is externally led while crossing the empty region S formed in the disconnected portion of each of the first to nth spiral patterns B1 to Bn of the second wiring portion 130b.

As shown in FIGS. 4 and 6, electrode pads 150 are externally exposed to be electrically or physically connected to other members, and are respectively disposed at both ends of the coil wiring 130. A second end of the lead wiring 135 is connected to a first electrode pad 150. An extension wiring 137, described below, is connected to a second electrode pad 150. The electrode pads 150 may be formed on either the first surface or the second surface of the substrate 120.

However, the electrode pads 150 may be formed on the first and second surfaces, if necessary or desired.

According to an embodiment, the electrode pads 150 are not limited to the abovementioned structure. An electrode pad may be understood as being one of the electrode pads 150 as long as the electrode pad is a circuit wiring having an area expanded greater than a line width of the lead wiring 135 or the spiral pattern to connect a plurality of wirings or a plurality of conductive vias 140.

The coil wiring 130, according to an embodiment, may also include the conductive via 140 and the extension wiring 137. The conductive via 140 passes through the substrate 120, and electrically connects the first wiring portion 130a to the second wiring portion 130b. According to an embodiment, the conductive via 140 includes the first via 140a and a second via 140b.

The first via 140a connects the first to nth spiral patterns A1 to An of the first wiring portion 130a to the first to nth spiral patterns B1 to Bn of the second wiring portion 130b. In more detail, the first via 140a connects both ends of each of the first to nth spiral patterns A1 to An of the first wiring portion 130a to the second wiring portion 130b. Similarly, the first via 140a connects both ends of each of the first to nth spiral patterns B1 to Bn of the second wiring portion 130b to the first wiring portion 130a. Thus, the first via 140a allows the first to nth spiral patterns A1 to An of the first wiring portion 130a and the first to nth spiral patterns B1 to Bn of the second wiring portion 130b to be connected to each other to form a continuous coil structure. The second via 140b electrically connects the lead wiring 135 to the first wiring portion 130a.

The coil structure, according to an embodiment, will be described below.

Figure 7:
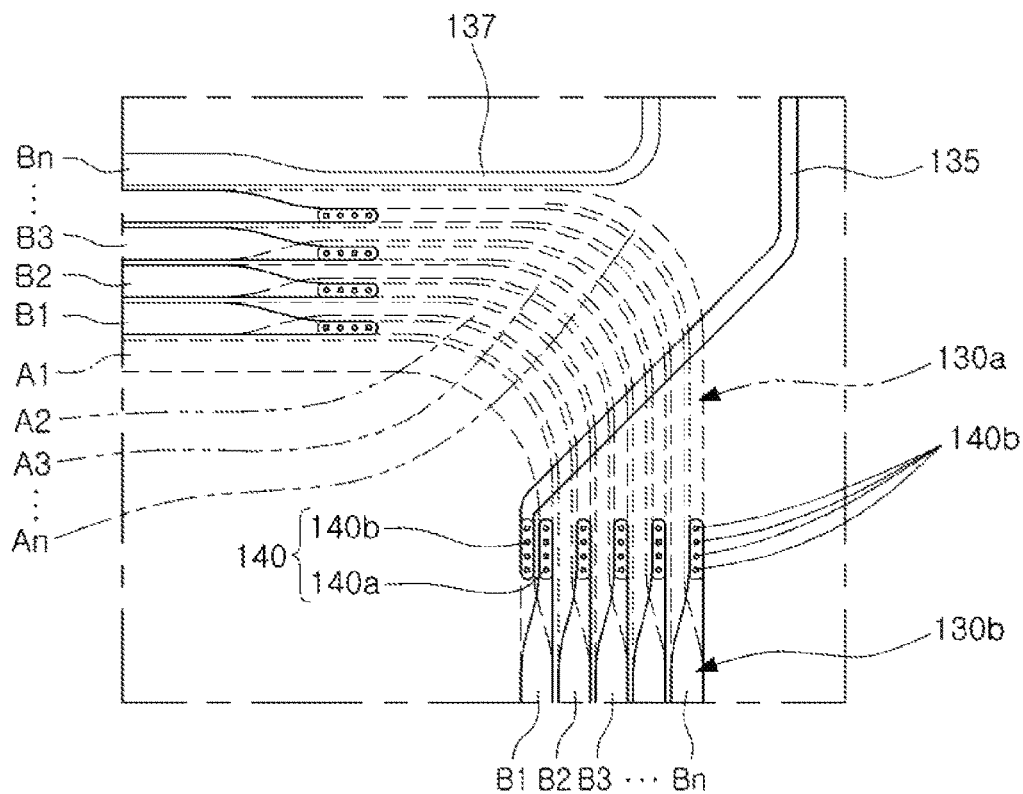
FIG. 7 is a view illustrating a coil wiring of FIGS. 5 and 6, according to an embodiment.
Figure 8:
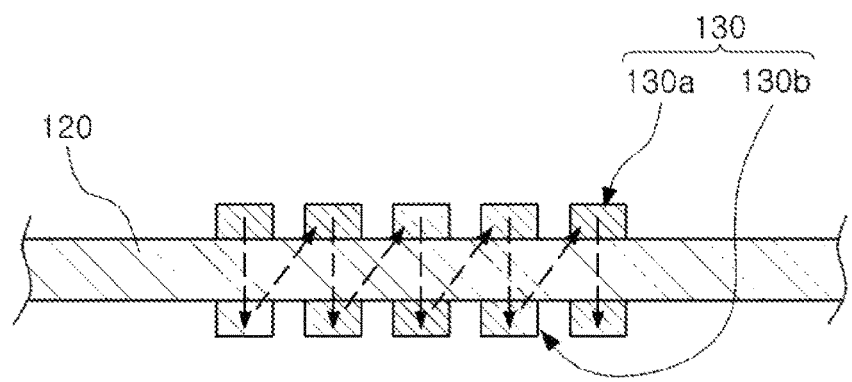
FIG. 8 is a cross-sectional view taken along line II-II' of FIG. 3.

FIG. 7 is a view illustrating the first and second wiring portions 130a and 130b of FIGS. 5 and 6 together, for example. FIG. 8 is a cross-sectional view taken along line II-II' of FIG. 3.

Referring to FIGS. 7 and 8, one end of the lead wiring 135 disposed on the coil substrate 110 is connected to one end of the first spiral pattern A1 of the first wiring portion 130a through the first via 140a. The other end of the first spiral pattern A1 is connected to one end of the first spiral pattern B1 of the second wiring portion 130b through the first via 140a.

In sequence, the other end of the first spiral pattern B1 is connected to one end of the second spiral pattern A2 of the first wiring portion 130a through the first via 140a, and the other end of the second spiral pattern A2 is connected to one end of the second spiral pattern B2 through the first via 140a.

By repeating such a connection to the nth spiral pattern Bn, the other end of the nth spiral pattern Bn disposed on the outermost side of the first to nth spiral patterns B1 to Bn is connected to the second electrode pad 150 through the extension wiring 137.

Accordingly, as illustrated in FIG. 8, the coil wiring 130 has coil turns alternately disposed on both surfaces of the substrate 120.

As illustrated in FIG. 7, according to an embodiment, the plurality of conductive vias 140 are spaced apart from each other in rows in the winding directions of the first and second wiring portions 130a and 130b. Thus, even though the line widths of the ends of the first and second wiring portions 130a and 130b are narrow, reliability of connection may be secured.

The extension wiring 137 may be a wiring of a section led externally from the outermost side of the first to nth spiral patterns B1 to Bn. In a variation in which the electrode pad 150 is in close proximity to the first to nth spiral patterns B1 to Bn, the first to nth spiral patterns B1 to Bn may be directly connected to the electrode pad 150, and the extension wiring 137 may thus be removed. However, when the electrode pad 150 is spaced apart from the first to nth spiral patterns B1 to Bn, as illustrated in FIGS. 4, 6 and 7, the extension wiring 137 connecting the first to nth spiral patterns B1 to Bn to the electrode pad 150 may be provided.

The extension wiring 137 may only be formed on one surface of the coil substrate 110, as illustrated in FIGS. 6 and 7. However, the disclosure is not limited to such a configuration, and the extension wiring 137 may also repeatedly pass on both surfaces of the coil substrate 110. Although not illustrated, a separate coil wiring may also be formed using the extension wiring 137.

As the coil substrate 110 has the structure described above, the coil wiring 130, according to an embodiment, is formed in a two-layer structure, and is repeatedly disposed on the first and second surfaces of the substrate 120. For example, when a first turn is disposed on the first surface, a second turn may be disposed on the second surface. Similarly, a third turn may be disposed on the first surface, and a fourth turn may be disposed on the second surface. The coil wiring 130 may be formed in a three-dimensional structure in which such a structure is repeated.

Thus, providing coil wiring 130 on two surfaces of the substrate 120 allows the line width of each coil turn to be significantly increased, so that the coil wiring 130 having a desired number of windings may be formed while retaining a maximum line width within the coil substrate 110. In addition, the coil substrate 110, according to an embodiment, may be formed on the substrate 120 in a circuit pattern form, and may have a three-dimensional structure, for example, a solenoid structure. Thus, the coil substrate 110 provides a higher level of inductance, as compared to a conventional coil substrate in which a coil wiring is formed in a two-dimensional structure.

The coil substrate 110, according to an embodiment, provides the empty region S in which the lead wiring 135 formed on the second surface of the coil substrate 110 is led externally from the coil wiring 130 while each of the second to nth spiral patterns A2 to An of the first wiring portion 130a formed on the first surface of the coil substrate 110 includes the extension section 132.

Even if the extension section 132 is removed, the structure of the coil wiring 130 repeatedly disposed on the first and second surfaces of the substrate 120 may be implemented. However, because the empty region S in which the lead wiring 135 is disposed would also be removed in such an example, a separate bridge may be formed, or a multilayer substrate 120 rather than a double-sided substrate 120 may be used, in order to provide a region on which to dispose the lead wiring 135. Thus, a thickness of the coil substrate 110 may also be increased.

In contrast, the coil substrate 110, according to an embodiment, has the empty region S in which the lead wiring 135 is disposed using the extension section 132, and the coil wiring 130 is formed using the double-sided substrate 120. Thus, the line width of the coil wiring 130 may be significantly increased while providing a significantly reduced thickness of the coil substrate 110 in comparison to conventional coil substrates.

In addition, the coil substrate 110 may have a narrow line width in the extension section 132 parallel to the winding section 131 of each of the first to nth spiral patterns A1 to An. Accordingly, even though including the extension section 132, the coil substrate 110 allows the intervals between the first to nth spiral patterns A1 to An to be retained, thus preventing the area of the coil substrate 110 from being expanded.

The abovementioned structure of the coil substrate 110 may be applied to the coil substrate 110 provided in the power transmitter 200 of the charger 20 of FIG. 2 in the same manner. Thus, a detailed description of the coil substrate included in the power transmitter 200 will be omitted.

The coil substrate 110 is not limited to the abovementioned embodiment, and may be applied in various ways. For example, the abovementioned embodiment illustrates a case in which the electrode pad 150 of the coil substrate 110 is disposed outside of the coil wiring 130, but may be modified in various ways, such as an example in which the electrode pad 150 is disposed inside of the coil wiring 130, and the like.

In addition, the abovementioned embodiment illustrates the coil substrate 110 provided in the power receiver 100 of the electronic device only as an example. However, the disclosure is not limited to such an example, and may be widely applied to an electronic component or an electronic device, in which a coil is be used, such as a transformer or a motor.

As set forth above, according to the embodiments, a coil substrate may include a coil formed in a desired winding number while maintaining a maximum line width. Further, the coil substrate may provide a higher level of inductance by forming a coil wiring in a three-dimensional structure, for example, a solenoid structure, as compared to a conventional coil substrate having a coil wiring formed in a two-dimensional structure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil substrate for wireless power transmission, comprising:
   an insulating substrate comprising a first surface and a second surface;
   a first wiring portion disposed on the first surface, wherein the first wiring portion comprises first spiral patterns and a section in which opposing ends of each of the first spiral patterns are disposed parallel to each other and overlapping, spaced apart, and insulated from each other in a direction from an inside to an outside of the first spiral patterns;
   a second wiring portion disposed on the second surface and comprising second spiral patterns, wherein opposing ends of each of the second spiral patterns are spaced apart from each other across a region and insulated from each other across the region;
   a first conductive via connecting a second end of a first spiral pattern of the first spiral patterns to a first end of a second spiral pattern of the second spiral patterns; and
   a second conductive via connecting a second end of the second spiral pattern to a first end of a next first spiral pattern of the first spiral patterns to form coil turns of alternately first and second spiral patterns.

2. The coil substrate of claim 1, wherein the first spiral patterns comprise:
   a winding section forming a single coil turn; and
   an extension section extending from the winding section and disposed parallel to a portion of the winding section.

3. The coil substrate of claim 2, wherein a line width of the extension section and a line width of a portion of the winding section parallel to the extension section are narrower than a line width of a portion of the winding section extending from the extension section.

4. The coil substrate of claim 1, wherein the first and second conductive vias are disposed in the opposing ends of each of the second spiral patterns to connect the first wiring portion to the second wiring portion.

5. The coil substrate of claim 1, further comprising a lead wiring, wherein the lead wiring comprises an end disposed inside the second spiral patterns, and a portion intersecting the region between the second spiral patterns where the opposing ends of each of the second spiral patterns are spaced apart from each other.

6. A wireless power coil substrate, comprising:
   an insulating substrate;
   a first wiring portion, comprising first and second end portions disposed in parallel to each other on a first surface of the insulating substrate;
   a second wiring portion, comprising first and second end portions disposed spaced apart from each other across a region and insulated from each other across the region on a second surface of the insulating substrate; and
   a plurality of first conductive vias connecting second end portions of the first wiring portion to first end portions of the second wiring portion, and a plurality of second conductive vias connecting second end portions of the second wiring portion to first end portions of the first wiring portion,
   wherein the first wiring portion and the second wiring portion are alternately connected to form a plurality of coil turns,
   wherein the second wiring portion is traversed by the region, and
   wherein the end portions of the first wiring portion disposed in parallel with each other are disposed in a position corresponding to the region.

7. The coil substrate of claim 6, wherein the first wiring portion comprises first patterns disposed between respective first and second end portions, the second wiring portion comprises second patterns disposed between respective first and second end portions, and wherein the plurality of first and second conductive vias connect end portions of the patterns of the first wiring portion to end portions of the patterns of the second wiring portion.

8. The coil substrate of claim 6, wherein the second wiring portion comprises a pattern which is partially disconnected such that the end portions are disposed to be spaced apart by a predetermined distance.

9. The coil substrate of claim 8, wherein the second wiring portion further comprises a lead wiring in which one end is disposed inside the pattern of the second wiring portion to intersect the region between the disconnected end portions, and the other end is disposed outside of the pattern of the second wiring portion.

10. The coil substrate of claim 9, wherein the lead wiring is disposed in the region in which the pattern of the second wiring portion is disconnected.

11. The coil substrate of claim 9, further comprising a third conductive via connecting the lead wiring and the first wiring portion.

12. The coil substrate of claim 6, wherein the plurality of first and second conductive vias are disposed in a row in winding directions of the first wiring portion and the second wiring portion.

13. The coil substrate of claim 6, wherein a line width of one end portion of the end portions disposed on the first surface and a line width of the other end portion disposed in parallel to the one end portion are formed to be narrower than the line width of the pattern extending from the one end portion.

14. The coil substrate of claim 6, further comprising a lead wiring in which one end is connected to one end of a pattern forming the plurality of coil turns and the other end is connected to a pad.

15. The coil substrate of claim 14, wherein the lead wiring is disposed on the second surface to be disposed to intersect the region between the end portions spaced apart from each other.

16. The coil substrate of claim 6, wherein the first wiring portion and the second wiring portion are repeatedly alternately connected to complete a coil shape, wherein the first wiring portion comprises a narrower line width in a position corresponding to the region.

17. An electronic device, comprising:
a wireless power coil disposed on a substrate and comprising
a first wiring portion formed on a first surface of the substrate,
a second wiring portion disposed on a second surface of the substrate, and
conductive vias connecting the first wiring portion and the second wiring portion to each other to form coil turns,
wherein opposing ends of the first wiring portion are disposed overlapping in a direction from an inside to an outside of the coil turns, and
wherein the conductive vias connect a first end of a second spiral pattern of the second wiring portion to a second end of a first spiral pattern of the first wiring portion extending toward the inside of the coil turns from the second spiral pattern and a second end of the second spiral pattern to a first end of another first spiral pattern of the first wiring portion extending toward the outside of the coil turns from the second spiral pattern.

18. The electronic device of claim 17, wherein:
the first wiring portion comprises first spiral patterns and a section in which opposing ends of each of the first spiral patterns are disposed parallel to each other; and
the second wiring portion comprises second spiral patterns, wherein opposing ends of the second spiral patterns are spaced apart from each other.

19. The electronic device of claim 18, wherein the vias connect the first spiral patterns and the second spiral patterns to each other in an alternating manner.

20. The electronic device of claim 18, wherein the second wiring portion further comprises a lead wiring, and wherein the lead wiring comprises an end disposed inside the second spiral patterns, a portion intersecting a region between the opposing ends of the second spiral patterns, and another end disposed outside the second spiral patterns.

21. The electronic device of claim 17, further comprising either one or both of:
a power receiver configured to wirelessly receive power using the first wiring portion and the second wiring portion; and
a power transmitter configured to wirelessly transmit power using the first wiring portion and the second wiring portion.

* * * * *